United States Patent [19]

Musselmann et al.

[11] Patent Number: 4,646,979

[45] Date of Patent: * Mar. 3, 1987

[54] APPARATUS FOR CLEANING FIBROUS SUSPENSIONS

[75] Inventors: Walter Musselmann, Heidenheim; Helmut Konecsny, Giengen, both of Fed. Rep. of Germany

[73] Assignee: J. M. Voith GmbH, Fed. Rep. of Germany

[*] Notice: The portion of the term of this patent subsequent to Feb. 10, 2004 has been disclaimed.

[21] Appl. No.: 680,741

[22] Filed: Dec. 12, 1984

[30] Foreign Application Priority Data

Dec. 16, 1983 [DE] Fed. Rep. of Germany ... 8336133[U]

[51] Int. Cl.⁴ .......................... D21B 1/32; D21C 5/02
[52] U.S. Cl. ...................................... 241/46.17; 162/4; 162/261; 209/211; 68/181 R
[58] Field of Search .................... 209/211; 241/46.17, 241/46.11; 162/261, 4, 5, 55; 68/181 R

[56] References Cited

U.S. PATENT DOCUMENTS

| | | | |
|---|---|---|---|
| 3,859,206 | 1/1975 | Baggaley | 209/211 |
| 3,942,728 | 3/1976 | Christ et al. | 241/46.17 |
| 3,989,197 | 11/1976 | Neitzel | 241/46.17 |
| 4,017,033 | 4/1977 | Trä | 162/4 |
| 4,135,671 | 1/1979 | Kohrs | 241/46.11 |
| 4,167,249 | 9/1979 | Kohrs | 241/46.17 |
| 4,252,640 | 2/1981 | Musselmann | 209/211 |
| 4,397,713 | 8/1983 | Lambrecht | 162/261 |
| 4,447,320 | 5/1984 | Lamort | 209/273 |

FOREIGN PATENT DOCUMENTS 638380 12/1978 U.S.S.R. .............. 209/211

Primary Examiner—S. Leon Bashore
Assistant Examiner—K. M. Hastings
Attorney, Agent, or Firm—Jeffers, Irish & Hoffman

[57] ABSTRACT

A washing apparatus for processing and cleaning highly contaminated fibrous suspension made from waste paper and containing a high proportion of lightweight contaminants such as foils. The apparatus includes a generally circular rotation chamber and a good half-stuff chamber separated from the rotation chamber by a substantially planar strainer. A revolving rotor is fitted within the rotation chamber in front of the strainer. An entry chamber for receiving fibrous suspension in washing water communicates with the rotation chamber. The entry chamber is of a substantially smaller diameter than the rotation chamber and includes a washing water connection. A waste matter extraction line leads off from the rotation chamber.

3 Claims, 1 Drawing Figure

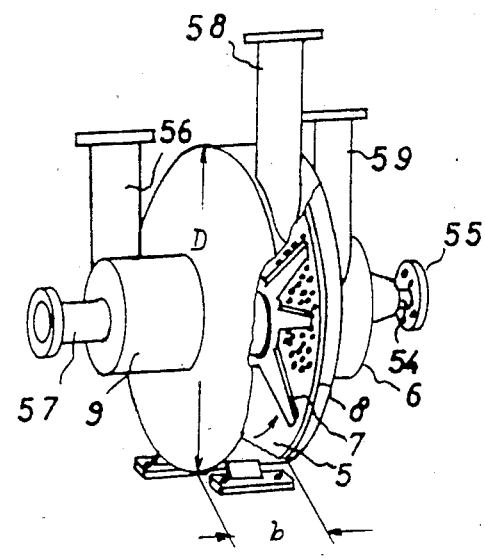

APPARATUS FOR CLEANING FIBROUS SUSPENSIONS

BACKGROUND OF THE INVENTION

The invention relates to a washing apparatus for cleaning highly contaminated fibrous suspensions. More particularly, the invention relates to a washing apparatus for cleaning highly contaminated fibrous suspensions made from waste paper and containing a high proportion of specifically lightweight contaminants such as foils.

A very wide variety of washing apparatus for cleaning highly contaminated fibrous suspensions are known. However, all of such apparatus are relatively expensive and complicated. Waste paper suspensions that are obtained after pulping waste paper in a breaker contain a considerable proportion of contaminants, and especially coarse contaminants. Consequently, there is a requirement or need for a washing device which is relatively simple in construction, and therefore operationally reliable, that can cleanse the waste paper of coarse contaminants in an inexpensive way.

Furthermore, as far as possible, the washing device should be able to further break down pieces of waste paper in the suspension, and cleanse lightweight contaminants, such as foils, insofar as these lightweight contaminants are still present in the suspension.

SUMMARY OF THE INVENTION

It is an object of the invention to provide and improve washing apparatus for cleaning highly contaminated fibrous suspensions made from waste paper and containing a high proportion of specifically lightweight contaminants such as foils.

It is another object of the invention to provide such a washing device that is of a relatively simple construction.

It is another object of the invention to provide such a washing device that is operationally reliable.

It is another object of the invention to provide such a washing device that can cleanse the waste paper of coarse contaminants in an inexpensive fashion.

It is another object of the invention to provide such a washing device that is able to further breakdown pieces of waste paper in the suspension.

Finally, it is an object of the invention to provide such a washing apparatus that can cleanse lightweight contaminants such as foils from a waste paper suspension.

The invention is a washing apparatus for processing and cleaning highly contaminated fibrous suspensions such as a suspension made from waste paper containing the high proportion of lightweight contaminants such as foils. The apparatus comprises a generally circular rotation chamber and a good half-stuff chamber. The good half-stuff chamber is separated from a rotation chamber by a substantially planar strainer. A revolving rotor is fitted within the rotation chamber in front of the strainer. The apparatus further includes an entry chamber for receiving fibrous suspension and washing water. The entry chamber communicates with the rotation chamber. The entry chamber is of a substantially smaller diameter than the rotation chamber. The entry chamber has a washing water connection. A waste matter extraction line leads off from the rotation chamber.

BRIEF DESCRIPTION OF THE DRAWING

The above-mentioned and other features and objects of this invention and the manner of attaining them will become more apparent and the invention itself will be best understood by reference to the following description of an embodiment of the invention taken in conjunction with the accompanying drawing.

FIG. 1 is a perspective view of the specific embodiment of the washing apparatus with a portion of the housing cut away.

DETAILED DESCRIPTION OF A SPECIFIC EMBODIMENT

The apparatus is in the form of a washing filter comprising a central circulation rotation chamber 5 which is separated from a good half-stuff chamber 6 by a strainer 8. A revolving rotor 7 is positioned in front of strainer 8 and rotates coaxially within the rotation chamber. Rotation chamber 5 includes an entry chamber 9 disposed coaxially therewith and connected thereto on the upstream side. Entry chamber 9 has an in-flow nozzle 56 connected tangentially to it. Fibrous suspension is received into chamber 9 through in-flow nozzle 56. Entry chamber 9 has an inlet nozzle 57 connected axially to its end wall. Wash water is received into entry chamber 9 through inlet nozzle 57.

The rotation chamber 5 of this washing filter is constructed as a substantially flattened circular cylinder. The entry chamber 9 is also in the form of a circular cylinder. The diameter of the entry chamber 9 is considerably smaller than the diameter of the rotation chamber 5. More specifically, the diameter of entry chamber 9 is between approximately 30% and approximately 60% of the diameter of the rotation chamber 5.

As illustrated in FIG. 1, the rotation chamber 5 has a width "b" and a diameter "D". Width "b" is approximately 30 cm. The ratio of its width to its diameter, b/D, lies between 0.15 and 0.35. For a satisfactory washing effect a ratio of between 0.2 and 0.3 has been found to be the most suitable. This gives a large strainer area 8 with a relatively small-volume rotation chamber 5. The arrangement of the entry chamber upstream and the flattened "discshaped" rotation chamber ensure a good flushing effect by the washing water, and owing to the large strainer area which is thus made possible, a high throughput level is achieved. Previously-known washing filters would be completely unsuitable for this purpose, due to the fact that the fibrous suspension to be handled has relatively coarse contaminants mixed through it.

The diameter of the holes in the washing filter strainer 8 is expediently between 2 mm and 3 mm.

Behind the strainer 8 good half-stuff is drawn off from a good half-stuff chamber 6 via a nozzle 59. The contaminant portion left behind in the rotation chamber 5 is conducted away via the tangential extraction nozzle 58.

The apparatus is operated periodically and then a valve in the line connected to the extraction nozzle 58 is closed, and a shut-off valve in the line connected to the extraction nozzle 59 is held open. By this means, during the washing process when washing water is being supplied, the rotor can break down shreds of paper further so that fibers with a low proportion of contaminants then arrive in the good half-stuff chamber 6 and are drawn off from there. If the proportion of contaminants is too high, the supply of fibrous suspension via the nozzle 56 is shut off, the valve in the line connected to the nozzle 58 is opened, and further washing water is supplied via the nozzle 57. The rotation chamber 5 is cleared of waste matter in this way.

It is advantageous to connect the washing filter described above to the contaminant extraction from a secondary pulper. The volume of the rotation chamber 5 is then considerably smaller than the volume of the rotation chamber normally provided in such a secondary pulper.

While there have been described above the principles of this invention in connection with specific apparatus, it is to be clearly understood that this description is made only by way of example and not as a limitation to the scope of the invention.

What is claimed:

1. A washing apparatus for processing and cleaning highly contaminated fibrous suspension containing a high proportion of light-weight contaminants through intensive contaminant removal, the apparatus comprising:

a generally circular rotation chamber and an accepts chamber, said accepts chamber separated from the rotation chamber by a substantially planar strainer, a revolving rotor is fitted within said rotation chamber upstream of said strainer, a generally round entry chamber having a first in-flow nozzle tangentially connected thereto and in communication through one connector with a source of fibrous suspension so that the entry chamber tangentially receives the fibrous suspension, and a second in-flow nozzle axially connected to the center of an end side of said entry chamber and in communication through another connector having a diameter and with a source of washing water so that the washing water is axially received within the entry chamber and axially communicates with said rotation chamber, the diameter of the end side being greater than the diameter of the other connector, the diameter of said entry chamber is between about 40% and about 70% smaller than the diameter of said rotation chamber, a waste matter extraction line connected to the rotation chamber and leading off from said rotation chamber, and said rotation chamber is constructed as a narrow circular cylinder wherein the ratio of the width of said rotation chamber to the diameter of said rotation chamber being between about 0.15 and about 0.35 so as to provide intensive contaminant removal.

2. The apparatus according to claim 1 wherein said apparatus is connected directly to a primary pulper via said entry chamber.

3. The apparatus according to any one of claims 1 or 2 wherein said revolving rotor is disposed coaxially with respect to said rotation chamber and said entry chamber.

* * * * *